United States Patent
Zheng et al.

(10) Patent No.: US 9,582,934 B2
(45) Date of Patent: Feb. 28, 2017

(54) METHOD AND SYSTEM FOR EFFICIENT EXTRACTION OF A SILHOUETTE OF A 3D MESH

(75) Inventors: Yefeng Zheng, Dayton, NJ (US); Yu Pang, Philadelphia, PA (US); Rui Liao, Princeton Junction, NJ (US); Matthias John, Nürnberg (DE); Jan Boese, Eckental (DE); Shaohua Kevin Zhou, Plainsboro, NJ (US); Dorin Comaniciu, Princeton Junction, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 1104 days.

(21) Appl. No.: 13/235,802

(22) Filed: Sep. 19, 2011

(65) Prior Publication Data
US 2012/0069017 A1 Mar. 22, 2012

Related U.S. Application Data (60) Provisional application No. 61/384,484, filed on Sep. 20, 2010.

(51) Int. Cl.
*G06T 17/20* (2006.01)
*G06T 7/00* (2006.01)

(52) U.S. Cl.
CPC ............ *G06T 17/20* (2013.01); *G06T 7/0083* (2013.01); *G06T 2207/20136* (2013.01)

(58) Field of Classification Search
USPC ............................................. 345/420; 703/1
See application file for complete search history.

(56) References Cited

U.S. PATENT DOCUMENTS

| | | | |
|---|---|---|---|
| 5,579,455 A * | 11/1996 | Greene et al. ................ 345/422 |
| 6,047,088 A * | 4/2000 | van Beek et al. ............ 382/243 |
| 8,352,019 B2 * | 1/2013 | Starks ........................... 600/509 |
| 8,427,475 B2 * | 4/2013 | Ruijters et al. ............... 345/426 |
| 2008/0129726 A1 | 6/2008 | Kim et al. |
| 2008/0285858 A1 | 11/2008 | Weismuller et al. |
| 2010/0239148 A1 | 9/2010 | Zheng et al. |
| 2010/0249579 A1 | 9/2010 | Starks |

OTHER PUBLICATIONS

Hertzmann, Aaron, "Introduction to 3D Non-Photorealistic Rendering: Silhouettes and Outlines." Non-Photorealistic Rendering. SIGGRAPH 99 (1999).*
Eberly, David, Clipping a Mesh Against a Plane, http://www.geometrictools.com (2006): http://web.archive.org/web/20061212093212/http:// www.geometrictools.com/ Documentation/ClipMesh.pdf.*

* cited by examiner

*Primary Examiner* — Barry Drennan
*Assistant Examiner* — Richard M Russell (57) ABSTRACT

A method and system for extracting a silhouette of a 3D mesh representing an anatomical structure is disclosed. The 3D mesh is projected to two dimensions. Silhouette candidate edges are generated in the projected mesh by pruning edges and mesh points based on topology analysis of the projected mesh. Each silhouette candidate edge that intersects with another edge in the projected mesh is split into two silhouette candidate edges. The silhouette is extracted using an edge following process on the silhouette candidate edges.

27 Claims, 10 Drawing Sheets

METHOD AND SYSTEM FOR EFFICIENT EXTRACTION OF A SILHOUETTE OF A 3D MESH

This application claims the benefit of U.S. Provisional Application No. 61/384,484, filed Sep. 20, 2010, the disclosure of which is herein incorporated by reference.

BACKGROUND OF THE INVENTION

The present invention relates to medical imaging, and more particularly, to automatic extraction of a silhouette of a 3D mesh represented anatomical structure segmented in a 3D image volume. Aortic valve disease affects a large number of people globally and is the most common type of valvular disease in developed countries. Implantation of a prosthetic aortic valve is often necessary to replace a severely damaged native valve. Although open-chest valve surgery is a well established procedure, minimally invasive transcatheter aortic valve implantation (TAVI) is an emerging technique, especially for high-risk patients, to minimize the surgical trauma. Interventional surgeries, such as TAVI, are typically performed under the guidance of real time fluoroscopic (x-ray) images. Many anatomical structures are not visible on these 2D x-ray images when no contrast agent is applied. Overlay with a 3D anatomical model extracted from other imaging modalities, such as computed tomography (CT), C-arm CT, or magnetic resonance imaging (MRI), can provide valuable visual guidance. Such a 3D anatomical model is often represented as a surface mesh. However, overlay with a solid mask of the anatomical structure generated from the surface mesh can be too intrusive and valuable information can be blocked by the mask.

BRIEF SUMMARY OF THE INVENTION

The present invention provides a method and system for automatically extracting a silhouette of a 3D mesh representing an anatomical structure.

In one embodiment of the present invention, a 3D mesh is projected to two dimensions. Silhouette candidate edges are generated in the projected mesh. Each silhouette candidate edge that intersects with another edge in the projected mesh is split into two silhouette candidate edges. The silhouette is then extracted using an edge following process on the silhouette candidate edges.

These and other advantages of the invention will be apparent to those of ordinary skill in the art by reference to the following detailed description and the accompanying drawings.

DETAILED DESCRIPTION

The present invention is directed to a method and system for automatically extracting a silhouette of a 3D mesh representing an anatomical structure. Embodiments of the present invention are described herein to give a visual understanding of the mesh silhouette extraction method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, it is to be understood that embodiments of the present invention may be performed within a computer system using data stored within the computer system.

Figure 1A:
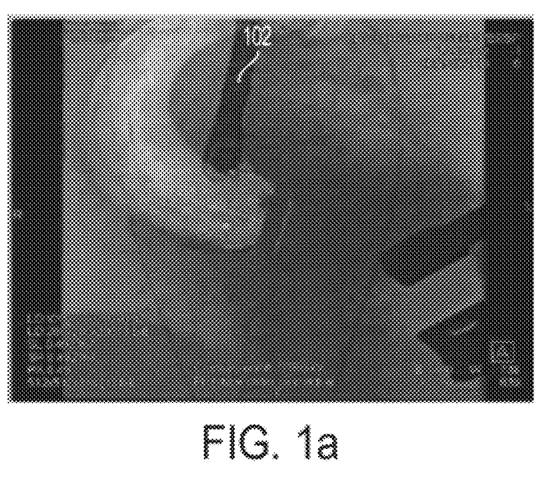
FIG. 1 illustrates the overlay of a 3D aorta extracted from a C-arm CT volume onto a fluoroscopic image.
Figure 1B:
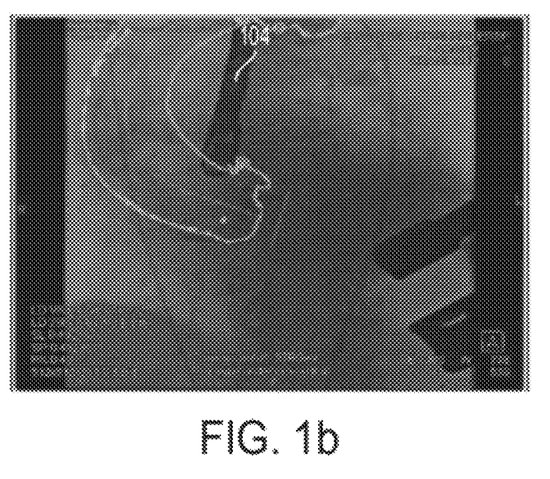

United States Published Patent Application No. 2010/0239148, which is incorporated herein by reference, describes a method to automatically detect and segment the aorta in a C-arm CT volume. The extracted aorta can be overlaid onto a 2D fluoroscopic image captured in real time in the same C-arm system to provide guidance to a physician during an aortic valve implantation surgery. FIG. 1 illustrates the overlay of a 3D aorta extracted from a C-arm CT volume onto a fluoroscopic image. Image (a) of FIG. 1 shows the overlay of a solid aorta mask 102 on a fluoroscopic image. As shown in image (a), the solid aorta mask 102 may be too intrusive and valuable image information can be blocked by the mask 102. In real clinical practice, physicians often prefer an overlay with an aorta contour or silhouette. Image (b) of FIG. 1 shows the overlay an aorta contour 104 on a fluoroscopic image. As shown in image (b), the aorta contour 104 only blocks a limited number of boundary pixels and keeps the region inside the aorta visible. The aorta contour 104 of image (b) is computed by efficient edge detection on the overlaid image with the solid aorta mask 102. In order to detect the aorta contour, a volume rendered overlaid image (image (a) of FIG. 1) is segmented by simple image intensity thresholding. Then, gradients of the segmented pixels are calculated. The maximum gradient value is also assigned to border pixels (i.e., pixels with at least one neighboring background pixel). Next, edge pixels are detected by hysteretic thresholding (similar to a canny edge detector) on the gradient values. Finally, connected components with a small number of detected edge pixels are removed. Since the contour is extracted from scratch using low level image processing, the high level semantic information (e.g., the connectivity of edge pixels) of the original aorta mesh is lost. As shown in image (b) of FIG. 1, the contour 104 may have different widths at different positions and it is not smooth.

Embodiments of the present invention provide a system and method for automatically extracting a silhouette of a 3D mesh representing an anatomical structure. The connectivity of the mesh points is preserved after projection of the mesh from 3D to 2D and can be used to efficiently extract the mesh silhouette. To improve the efficiency, the mesh points or edges are pruned based on topology analysis to generate silhouette candidates. A silhouette may be composed with either a full length or a part of an edge. Therefore, all intersecting candidate silhouette edges should be split at the intersection points into shorter segments. Starting from an initial point that is guaranteed to be on the silhouette, an edge following process is utilized to extract the silhouette.

Embodiments of the present invention are described herein using the example of extracting silhouette of a 3D mesh representing an aorta segmented from a 3D volume, but the present invention is not limited thereto. The extracted mesh silhouette for an aorta has many applications in the TAVI surgery. For example, a silhouette overlay of the aorta segmented from a C-arm CT volume is less intrusive than a solid overlay. The silhouette is also useful to constrain the search range for the detection of a pigtail catheter tip, which is an important clue for motion compensation in TAVI. Constraining the pixel intensity analysis inside the region enclosed by the silhouette, instead of the whole image, can improve the contrasted frame detection accuracy. Additionally, the silhouette may be used as a cost function term in 2D/3D registration. Many applications suggested in this disclosure are not limited to TAVI, and may also be applicable to other interventional operations for different anatomical structures, such as the left atrium fibrillation ablation.

Figure 2:
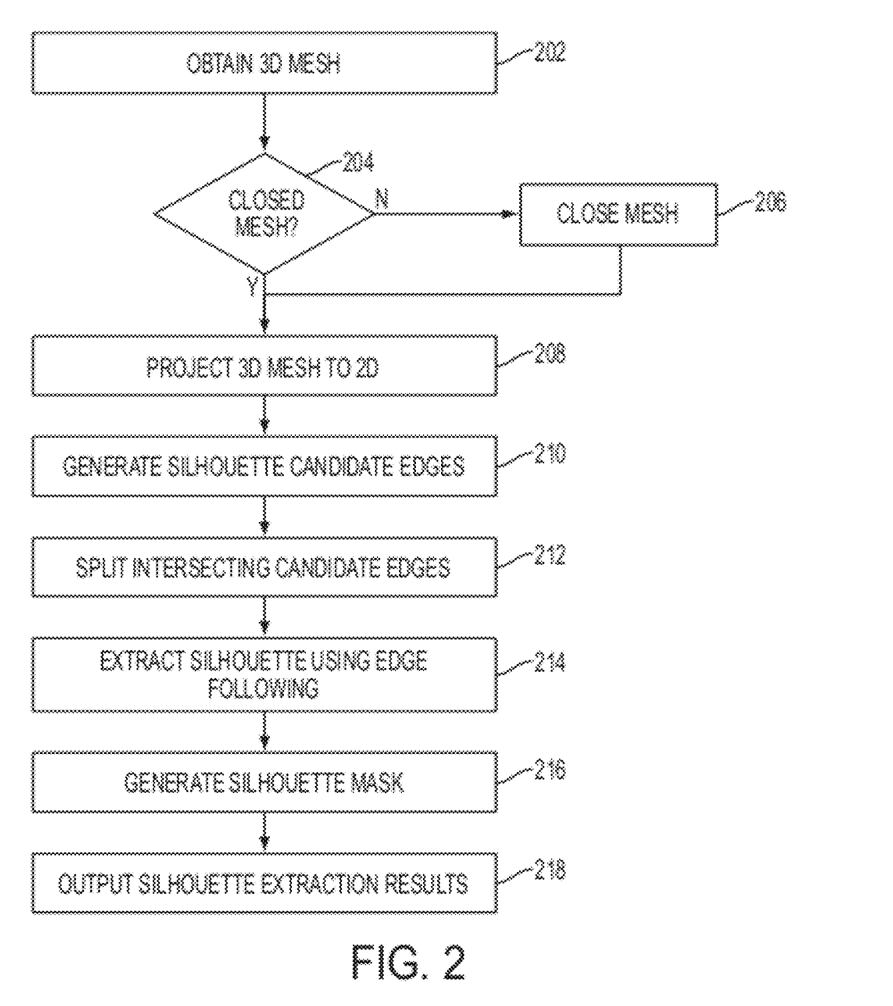
FIG. 2 illustrates a method of extracting a silhouette from a 3D mesh according to an embodiment of the present invention.

FIG. 2 illustrates a method of extracting a silhouette from a 3D mesh according to an embodiment of the present invention. As illustrated in FIG. 2, at step 202, a 3D mesh representing an anatomical structure is obtained. The 3D mesh may be obtained by segmenting the anatomical structure in a 3D medical image volume. For example, a 3D mesh of an aorta may be obtained by segmenting the aorta in a 3D C-arm CT volume using the method described in United States Published Patent Application No. 2010/0239148, which is incorporated herein by reference. It is to be understood that embodiments of the present invention also apply to other anatomical structures, such as heart chambers, and other imaging modalities, such as CT or MRI. The 3D mesh may also be obtained by loading a previously segmented 3D mesh stored on a memory or storage of a computer system or receiving electronic data representing a segmented 3D mesh from another computer system.

At step 204, it is determined if the mesh is a closed mesh. If the mesh is not closed (i.e., the mesh is an open mesh) the method proceeds to step 206. If the mesh is a closed mesh, the method proceeds to step 208. At step 206, if the mesh is not closed, the open mesh is converted to a closed mesh. For example, the aorta mesh segmented using the method described in United States Published Patent Application No. 2010/0239148 is open with a proximal hole around the aortic valve and a distal hole. The mesh can be converted to a closed mesh by closing each hole in the mesh by adding a mesh point to the hole center and connecting the mesh point at the hole center to all of the mesh points composing the hole rim. Once the mesh is converted to a closed mesh (at step 206), the method proceeds to step 208.

At step 208, the three dimensional (3D) mesh is projected to two dimensions (2D). A C-arm imaging system can be representing with sufficient accuracy by a pinhole camera model. A projection matrix P is defined as a combination of the extrinsic rotation R and translation T and an intrinsic parameter matrix:

$$A = \begin{bmatrix} f & 0 & u \\ 0 & f & v \\ 0 & 0 & 1 \end{bmatrix}. \quad (1)$$

Figure 3A:
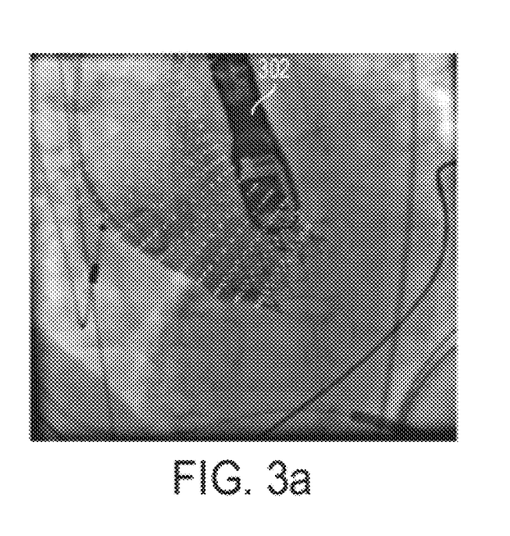
FIG. 3 illustrates the projection of a 3D aorta mesh onto a 2D fluoroscopic image.
Figure 3B:
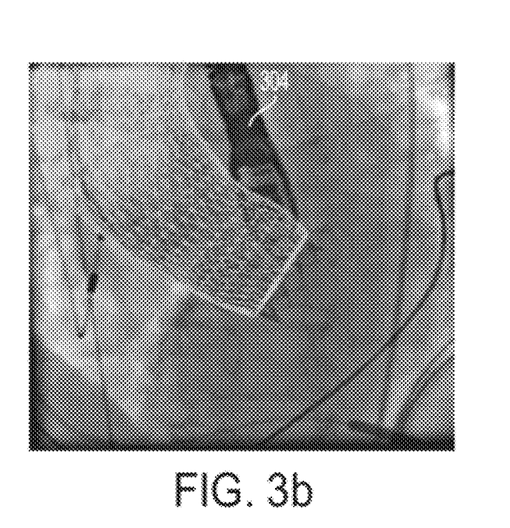

Here, f is the scale factor and (u, v) is the position of the pixel where the ray passes through the iso-center. The rotation can be described by two angles in the C-arm system, $\alpha$=cranio-caudal angle (CC) and $\beta$=right/left anterior orientation angle (RAO/LAO). Thus, the overall projection matrix is $P=ATR_\alpha R_\beta$. All the parameters can be extracted from the C-arm system or the saved DICOM image header. Given a 3D aorta model constructed from the C-arm CT images scanned by the same system, the aorta mesh can be projected onto a 2D fluoroscopic image using projection matrix P accordingly. FIG. 3 illustrates the projection of a 3D aorta mesh onto a 2D fluoroscopic image. As illustrated in FIG. 3, image (a) shows projected aorta mesh points 302 on the 2D fluoroscopic image and image (b) shows the project mesh 304 including the projected mesh points together with mesh triangulations. As shown in FIG. 3, the projected mesh points are scattered on the 2D image while they still maintain the same connectivity as in the 3D model. Using this information, the aorta silhouette can be extracted efficiently from the projected mesh.

Returning to FIG. 2, at step 210, silhouette candidate edges are generated by pruning edges and mesh points from the mesh. A mesh silhouette is not composed solely with full length of original mesh edges. That is the silhouette mesh may be composed of part of an original mesh edge, but not the full length of the original mesh edge. For this reason, the edge following method described below (step 214) does not work directly on the original projected mesh edges. Edges intersecting with other edges should be split into shorter segments before the edge following method will work properly. A densely sampled mesh may contain a very large number of mesh points. It is time consuming to calculate the intersection of all edge pairs of the original mesh. To speed up the computation, the projected mesh points are pruned by an efficient topology analysis to preserve a reduced number of candidate boundary edges.

In order to prune the projected mesh points and edges, inner mesh points and edges are distinguished from boundary mesh points and edges. The inner mesh points lie completely inside the region enclosed by the mesh. There are two ways to determine the candidate silhouette edges, one edge-based and the other point-based. A mesh is composed with mesh points and edges connecting neighboring mesh points. According to one embodiment, the edge-based approach analyzes each edge independently to determine if it is a candidate to compose the silhouette. For a closed surface mesh, each edge is shared by two faces (e.g., triangles in a triangulated mesh). Suppose the normal of the imaging plane is $N_1$ and the normal of the two faces shared by an edge are $N_1$ and $N_2$, respectively. If $N_1 \cdot N_1$ and $N_1 \cdot N_2$ have different signs (which means one face pointing towards the pin-hole camera and the other pointing away), the edge is a candidate silhouette edge. This approach assumes that the mesh has consistent normal directions (e.g., all faces have a normal pointing outside of the object). If this assumption is not held, it is possible, according to another embodiment, to use a more generic edge-based approach by analyzing the projected faces. An edge has two end points A and B, which are shared by the two neighboring faces. Suppose the third points from the two neighboring faces are $C_1$ and $C_2$, respectively. If $C_1$ and $C_2$ lie on the same side of the edge, edge AB should be added to the candidate set. After edge-based pruning, all the candidate edges are preserved together with the corresponding mesh points.

Figure 4A:
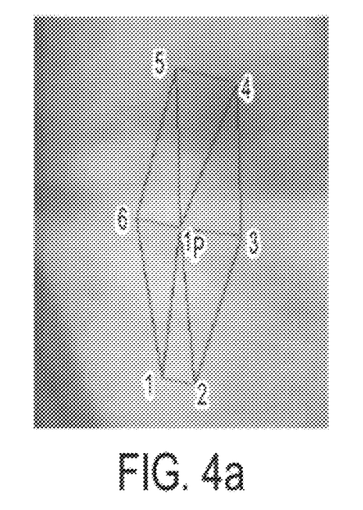
FIG. 4 illustrates an example of point-based silhouette candidate point pruning.
Figure 4B:
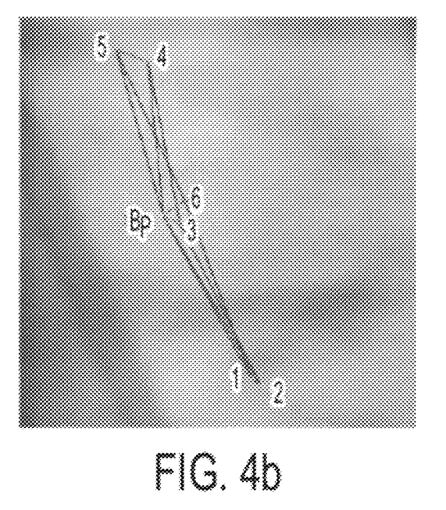
Figure 4C:
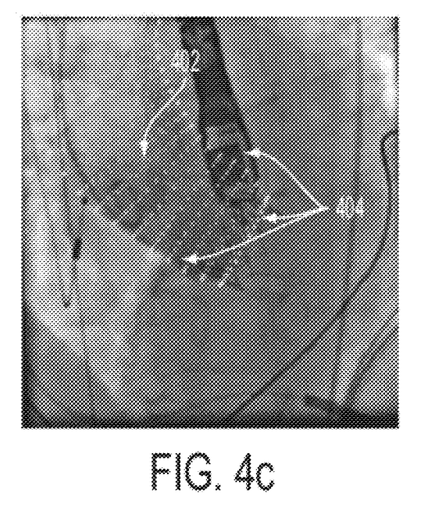

According to another embodiment of the present invention, a point-based method performs the topology analysis on each mesh point independently. FIG. 4 illustrates an example of point-based silhouette candidate point pruning. After projection, mesh points are divided into two categories: inner points ($I_p$) and boundary points ($B_p$), as shown in images (a) and (b) of FIG. 4, respectively. Since connectivity of the mesh points is preserved, the neighbors of a mesh point can be consistently ordered using the triangulation information. As shown in image (a) of FIG. 4, the six neighbors of point $I_p$ are ordered properly from 1 to 6. The closed contour composed by the neighbors is followed and the overall rotation is calculated to follow the contour. This is essentially a summation of the triangles inside the mesh at a mesh point. If the walking direction and the imaging plane normal follow the right-hand rule, a positive rotation is made, otherwise a negative rotation is made. For a boundary point $B_p$, the summation of the rotations is zero degrees. The overall rotation around an inner point $I_p$ is $2\pi$ or $-2\pi$ (i.e., 360 degrees). After point-based pruning of the inner points, all of the boundary points are preserved together with the edges connecting to the boundary points. These edges are considered the silhouette candidate edges. As shown in image (c) of FIG. 4, inner points 402 are to be pruned and points 404 are boundary points to be preserved.

Figure 5A:
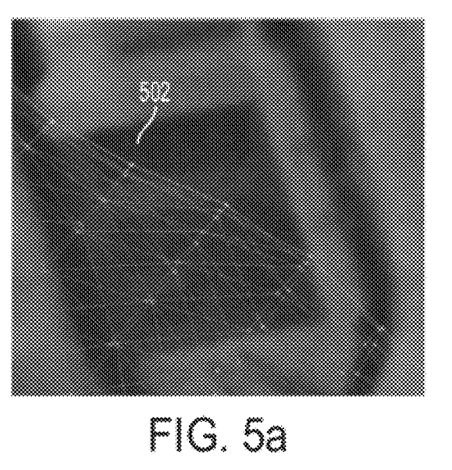
FIG. 5 illustrates an example of splitting a candidate edge.
Figure 5B:
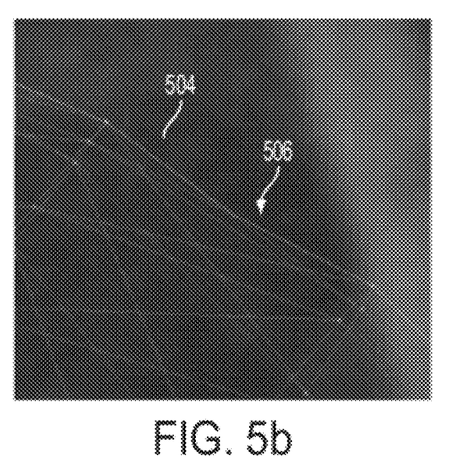

Returning to FIG. 2, at step 212, silhouette candidate edges that intersect with another edge are split. The silhouette may include the full length of a candidate edge or a part of a candidate edge. The latter scenario happens when an edge intersects another edge. Such an edge needs to be split into shorter segments from the intersection to generate multiple edge candidates for the edge following process. Suppose the mesh has M edges, the number of edge pairs is $M(M-1)/2$. Therefore, calculating the intersections of all edge pairs is time consuming if M is large. The mesh pruning of step 210 significantly reduces the number of candidate edges. According to an advantageous implementation, the following efficient checks can further speed up the computations necessary for detecting edge intersections. Suppose edge 1 has end points $E_A^1$ and $E_B^1$, edge 2 has end points $E_A^2$ and $E_B^2$. Suppose the end points are ordered from the left to the right, e.g., $E_A^1(x) \leq E_B^1(x)$ and $E_A^2(x) \leq E_B^2(x)$. Here, $E_A^1(x)$ represents the x coordinate of $E_A^1$. It is possible to quickly check whether two edges overlap in the horizontal direction. If $\max\{E_A^1(x), E_A^2(x)\} > \min\{E_B^1, E_B^2(x)\}$, the two edges have no overlap in the horizontal direction. If the end points are not ordered properly, the condition check can be modified as $\max\{\min\{E_A^1(x), E_B^1(x)\}, \min\{E_A^2(x), E_B^2(x)\}\} > \min\{\max\{E_A^1(x), E_B^1(x)\}, \max\{E_A^2(x), E_B^2(x)\}\}$. The same principle can be extended to check if two edges overlap vertically. Most non-overlapping edge pairs can be quickly discarded by these two condition checks. Those edge pairs for which the condition checks determine that they overlap horizontally or vertically are then compared to determine if they intersect and if so where they intersect. If an intersection is found between a candidate edge and another edge, the candidate edge is split and replaced by two edges in the set of silhouette candidate edges by adding a mesh point at the intersection. FIG. 5 illustrates an example of splitting a candidate edge. As illustrated in FIG. 5 image (a) shows a portion of a projected mesh 502 and image (b) shows a close-up view 504 of the projected mesh and an intersection 506 between a boundary edge and another edge in the projected mesh. A mesh point can be placed at the intersection 506 in order to split the boundary edge into two candidate edges.

Returning to FIG. 2, at step 214, the silhouette is extracted from the candidate edge set using an edge following process. The edge following process first finds the left most point of the set to use as a starting point. This point is guaranteed to be part of the silhouette. Straight downward (from the left most point) is defined as the initial edge-following direction. In order to extract the silhouette, the right most neighbor edge is followed to make sure that the object is consistently on the left. The edge following process ends when the edges are followed back to the starting point. The edge following process is guaranteed to come back to the starting point if all intersecting candidate edges have been split at step 212. If no edge splitting were performed, the edge following process may get stuck in an end point or a small loop in the middle of the mesh. With guaranteed convergence, embodiments of the present invention are very efficient and work for both convex and concave shapes.

At step 216, a silhouette mask can be generated from the extracted silhouette. For some applications, it is desirable to know if a pixel is inside the polygon enclosed by a silhouette. For example, in machine learning based pigtail catheter tip detection, each pixel is tested by a detector to determine a detection score. The pixel with the largest detection score is taken as the detection result. Since the pigtail catheter tip (and the whole catheter) is guaranteed to lie inside the aorta, it is only necessary to test those pixels enclosed by the extracted aorta silhouette to reduce false detections and increase the detection speed. After the silhouette is extracted, the plane sweep algorithm can be used to generate the silhouette mask. The plane sweep algorithm scans each column with a ray started from the top of the image to determine the intersection points with the silhouette. If the ray intersects with the silhouette an odd number of times, the portion of the ray lower than the final intersection point will be inside the mask, otherwise this portion of the ray will be out of the mask. Accordingly, in this way the silhouette can be efficiently converted to a pixel mask.

At step 218, the silhouette extraction results are output. For example the extracted silhouette and/or the generated silhouette mask can be output by being displayed on a display device of a computer, system being output to another image processing application, or being stored on a memory or storage of a computer system.

As described above, the method of FIG. 2 may be used to extract an aorta silhouette from a segmented aorta mesh. There are many possible applications for the extracted aorta mesh silhouette for TAVI. Some exemplary applications are described below.

Silhouette Based 2D/3D Overlay.

Figure 6:
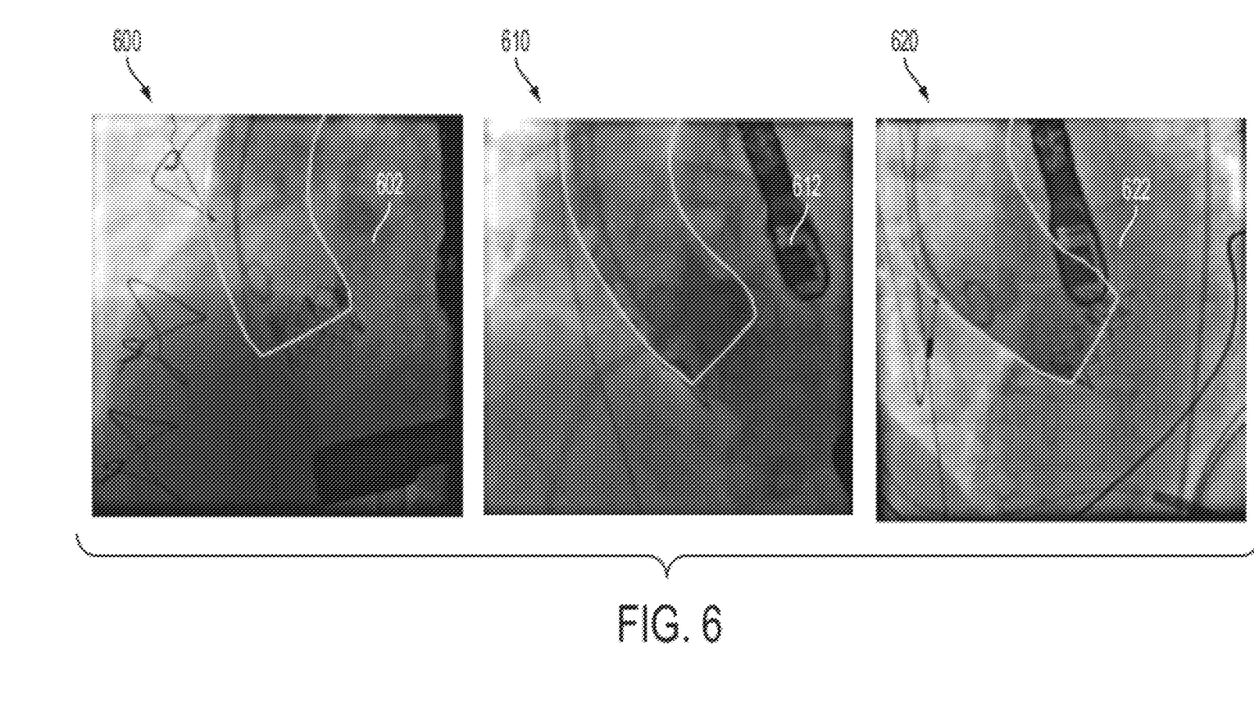
FIG. 6 illustrates examples of overlaying the silhouette extracted from a 3D aorta mesh onto a 2D fluoroscopic image.

Overlaying a 3D aorta mask and aortic valve landmarks plays an important role in guiding physicians to position and deploy the prosthetic valve properly in a TAVI procedure. Overlay with a solid aorta mask, as shown image (a) of FIG. 1, can be too intrusive. Silhouette based 2D/3D overlay provide the same visual guidance, but is far less intrusive. The contour extracted using low level image processing, as shown in image (b) of FIG. 1, is not accurate and also may depend on parameter settings of a tool used to generate the overlaid solid aorta mask. FIG. 6 illustrates examples of overlaying the silhouette extracted from a 3D aorta mesh onto a 2D fluoroscopic image. As illustrated in FIG. 6, fluoroscopic images 600, 610, and 620 have been overlayed with extracted silhouettes 602, 612, and 622, respectively. The silhouettes 602, 612, and 622 are accurate, without extra bumps on the contour.

Catheter Pigtail Tip Detection.

In aortic valve implantation surgery, a pigtail catheter is inserted inside the aorta to inject contrast agent. Thus, it is always inside the aorta and often inserted deep into the aortic valve leaflet pocket. Due to such tight attachment, the pigtail catheter tip has the same motion as the aortic valve. The aortic valve is visible for a short period when strong contrast is injected. However, the pigtail catheter can be seen throughout the fluoroscopic sequence, and therefore, the pigtail catheter provides an important clue to track aortic valve motion. In this application, the pigtail catheter is detected in the first frame and its motion is tracked in the whole sequence. In some cases, the detection result can vary a lot and it may be difficult to detect the right one among several candidates. For example, when the catheter is moving or rotating, it can be very vague and ambiguous to detect. Since the catheter is physically inside the aorta as mentioned above, the silhouette mask can be used as a hard constraint. Due to the heart motion, the silhouette extracted from the projection of a static 3D aorta model is not accurate enough. In this application the silhouette mask can be slightly expanded to constrain the search for the pigtail catheter. The amount of expansion is tuned on a large training set to make sure the pigtail catheter tip is guaranteed to lie inside the mask.

Figure 7A:
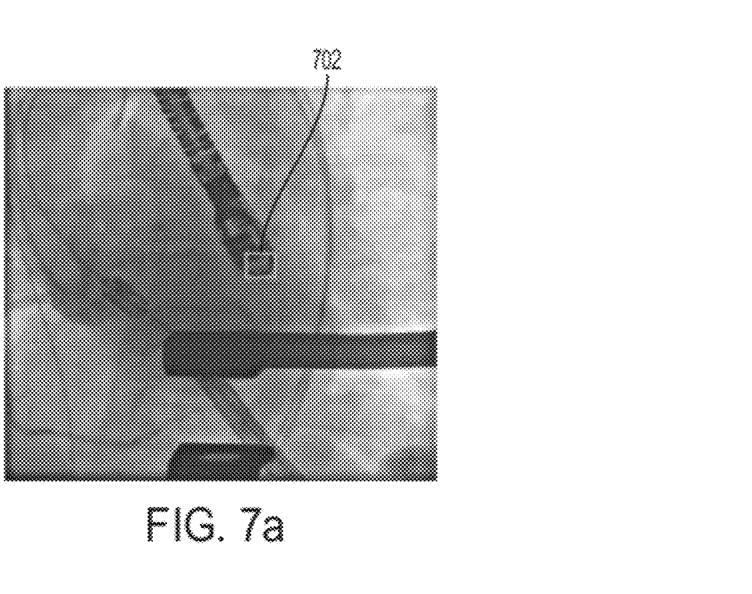
FIG. 7 illustrates exemplary pigtail tip detection using an aorta mesh silhouette.
Figure 7B:
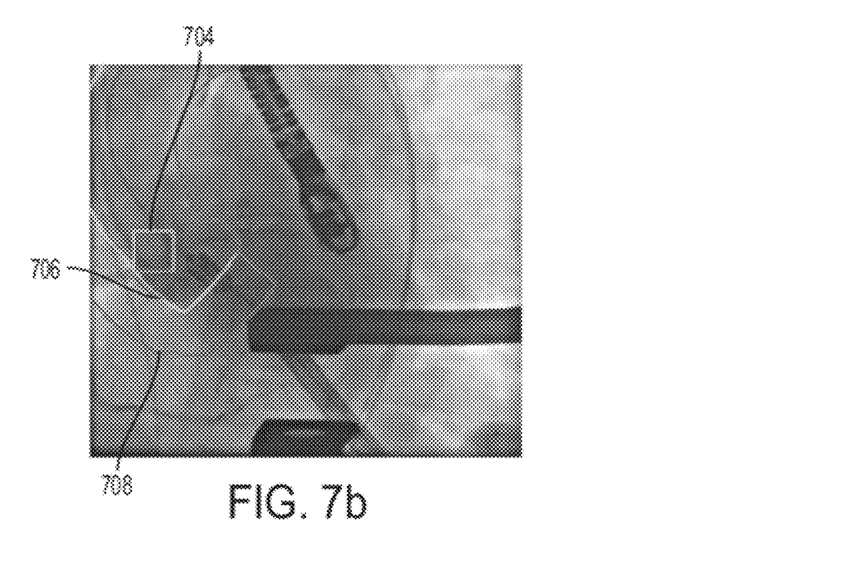

FIG. 7 illustrates exemplary pigtail tip detection using an aorta mesh silhouette. Image (b) of FIG. 7 shows the contour of the silhouette 706, as well as the contour of the expanded searching region 708. The present inventors have found that the cardiac motion introduced disparity only towards the bottom-left direction with respect to the 3D CT volume reconstruction phase under rapid pacing. It is not necessary to expand the mask on the top-right part of the silhouette. The silhouette based constraint can rule out many false alarms and dramatically reduce the computation time because normally the aorta mask (even the expanded mask) only covers less than 40% of the image area.

Images (a) and (b) of FIG. 7 show how the silhouette mask 706 improves the detection result. As shown in image (a), when the target is occluded or becomes vague, the detector tends to detect a wrong candidate with similar features to the pigtail catheter as the detection result 702. In many cases, the false positive detections are outside of the expanded aortic region 708. When the silhouette mask 706 is used to define the expanded searching region 708, which acts as a hard constraint, it rules out many false positive detections and detects the best candidate within the expanded searching region 708 as the detection result 704.

Contrast Frame Detection.

Figure 8:
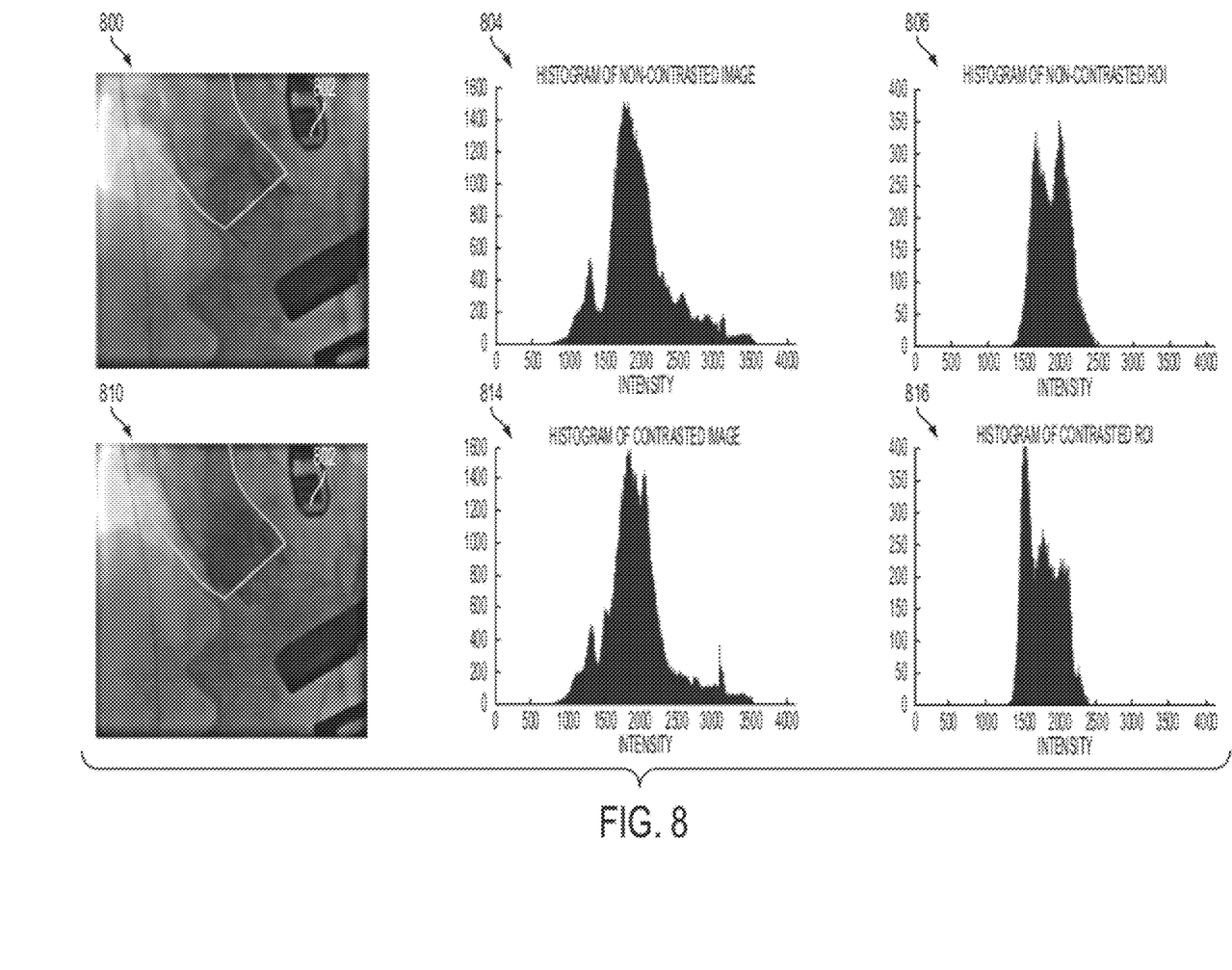
FIG. 8 illustrates an example of detection of a contrasted frame using an aorta mesh silhouette.

Injecting contrast is the main means to highlight vessels on a fluoroscopic image. Only when the contrast is injected can the vascular anatomy be seen clearly to guide the device operation accordingly. Therefore, many operations (e.g., 2D/3D registration) are only applicable on the contrasted frames and should be triggered automatically when contrast is injected. The contrast agent appears as a dark region on a fluoroscopic image. Therefore, a contrasted frame should have more dark pixels than a non-contrasted frame. FIG. 8 illustrates an example of detection of a contrasted frame using an aorta mesh silhouette. As illustrated in FIG. 8, image 800 is a frame of a fluoroscopic image sequence without contrast injected and image 810 is a frame of the fluoroscopic image sequence with contrast injected. An aorta mesh silhouette 802 is overlayed on frames 800 and 810. Image 804 is a pixel intensity histogram of the whole image for frame 800 and image 814 is a pixel intensity histogram of the whole image for frame 810. Image 804 is a pixel intensity histogram of a region of interest enclosed by the aorta mesh silhouette 804 in frame 800 and image 814 is a pixel intensity histogram of the region of interest enclosed by the aorta mesh silhouette 804 in frame 810. When the contrast injection is detected in the whole image, this detection may suffer from interference of noise and variation of other irrelevant anatomies. As shown in images 804 and 814 of FIG. 8, the pixel intensity histograms of the whole image are almost identical for the non-contrasted frame 800 and the frame 810 with slight contrast. However, as a priori knowledge, the contrast is always injected into vessels, e.g., the aorta, and coronaries in TAVI. In TAVI, the contrast is injected mainly inside the aorta with a very small amount inside the coronaries. Analyzing the intensity histograms 806 and 816 for the region enclosed by the aorta silhouette 804, the difference between non-contrasted and contrasted frames 800 and 810, respectively, is much larger that in the whole image. Thus, it is easier to distinguish them between the non-contrasted and contrasted frames when the detection is constrained to within the aortic valve mesh silhouette.

2D/3D Registration.

Figure 9A:
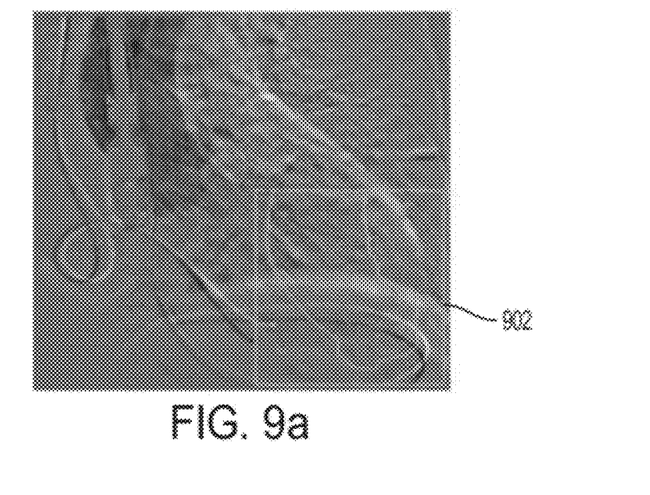
FIG. 9 illustrates exemplary registration of aorta mesh silhouette on a 2D fluoroscopic image.
Figure 9B:
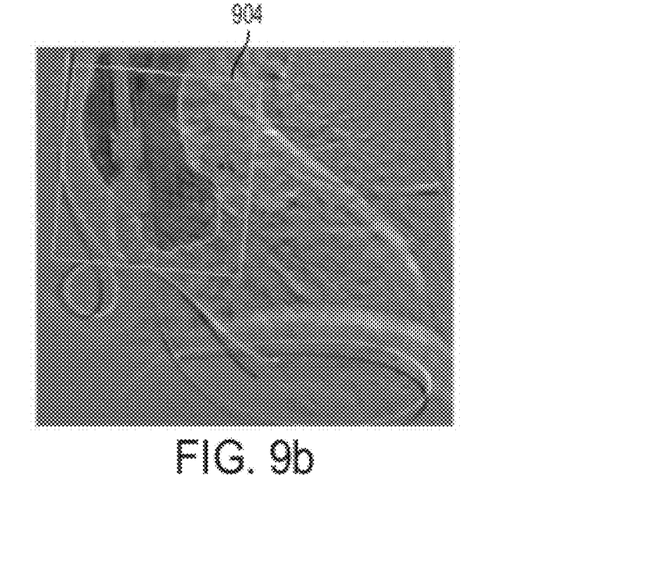

The 2D/3D registration is easy if a C-arm CT is captured in vivo during the AVI surgery. Since both the 3D C-arm CT and the 2D fluoroscopic images are captured on the same device within a short time interval, the projection parameters from the C-arm device is accurate enough for the projection. However, in many situations, only pre-operative CT (or C-arm CT) is available and physicians still want to make use of the pre-operative CT for surgery guidance. Since CT is scanned on a different device and very likely to be performed one day or even longer before the surgery, a sophisticated 2D/3D registration method is desirable in this scenario. FIG. 9 illustrates exemplary registration of aorta mesh silhouette on a 2D fluoroscopic image. Image (a) of FIG. 9 shows the aorta mesh silhouette 902 before registration and image (b) shows the aorta mesh silhouette 904 after registration. The registration is often done on contrasted frames since almost no relevant anatomical structure is visible on a non-contrasted frame. The 2D/3D registration is often formulated as an iterative optimization process. The pin-hole camera projection parameters are adjusted to minimize a cost function. Some exemplary cost function terms may be the average distance between the segmented aorta contour on the 2D fluoroscopic image and the projected mesh silhouette, or the pixel intensity homogeneity of the region enclosed by the silhouette, etc.

Figure 10:
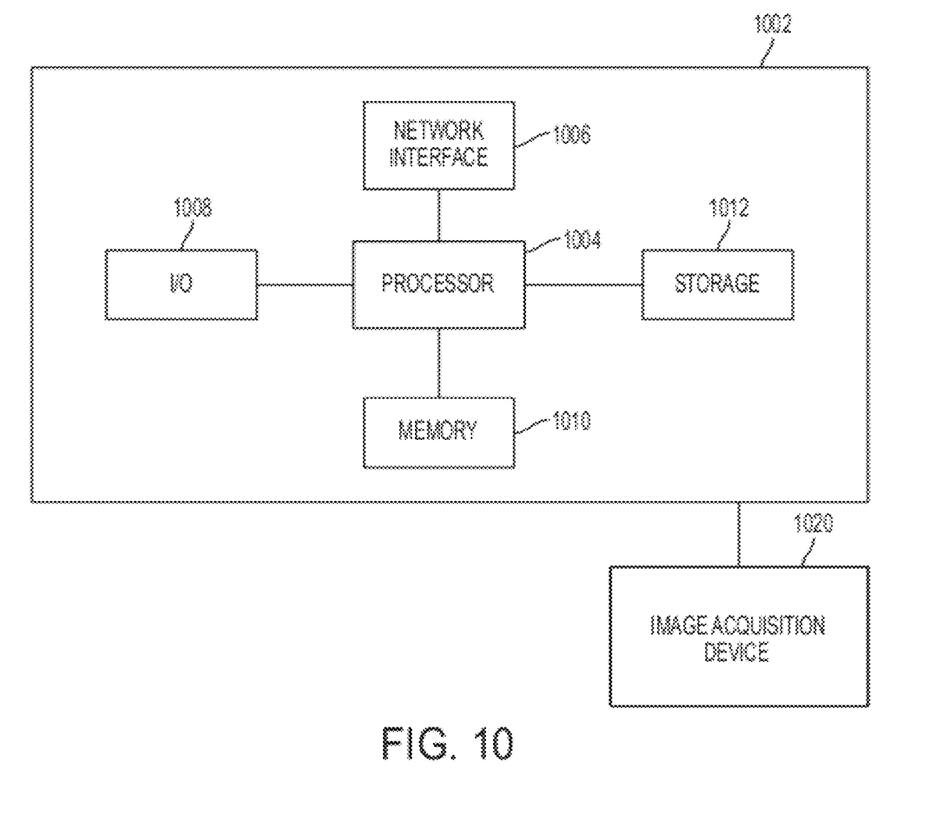
FIG. 10 is a high level block diagram of a computer capable of implementing the present invention.

The above-described methods for automatic extraction of a silhouette from a 3D mesh and the above-described applications for the extracted silhouette may be implemented on a computer using well-known computer processors, memory units, storage devices, computer software, and other components. A high level block diagram of such a computer is illustrated in FIG. 10. Computer 1002 contains a processor 1004 which controls the overall operation of the computer 1002 by executing computer program instructions which define such operation. The computer program instructions may be stored in a storage device 1012, or other computer readable medium (e.g., magnetic disk, CD ROM, etc.) and loaded into memory 1010 when execution of the computer program instructions is desired. Thus, the steps of the methods of FIG. 2, as well as the applications for the extracted silhouette, may be defined by the computer program instructions stored in the memory 1010 and/or storage 1012 and controlled by the processor 1004 executing the computer program instructions. An image acquisition device 1020, such as a C-arm image acquisition device, a CT scanner, etc., can be connected to the computer 1002 to input images to the computer 1002. It is possible to implement the image acquisition device 1020 and the computer 1002 as one device. It is also possible that the image acquisition device 1020 and the computer 1002 communicate wirelessly through a network. The computer 1002 also includes one or more network interfaces 1006 for communicating with other devices via a network. The computer 1002 also includes other input/output devices 1008 that enable user interaction with the computer 1002 (e.g., display, keyboard, mouse, speakers, buttons, etc.). One skilled in the art will recognize that an implementation of an actual computer could contain other components as well, and that FIG. 10 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for extracting a silhouette of a 3D mesh representing an anatomical structure, comprising:
   projecting the 3D mesh onto a 2D image;
   generating silhouette candidate edges in the projected mesh by pruning mesh points and edges of the projected mesh that lie completely inside a region enclosed by the projected mesh;
   splitting each silhouette candidate edge that intersects with another edge in the projected mesh into two silhouette candidate edges; and
   extracting the silhouette using an edge following process on the silhouette candidate edges.

2. The method of claim 1, wherein the 3D mesh is an open mesh, further comprising:
   converting the 3D mesh from an open mesh to a closed mesh prior to the step of projecting the 3D mesh to two dimensions.

3. The method of claim 2, wherein the step of converting the 3D mesh from an open mesh to a closed mesh prior to the step of projecting the 3D mesh to two dimensions comprises:
   adding a mesh point to the 3D mesh at a center of a hole in the 3D mesh; and
   adding edges to connect mesh points on a rim of the hole in the 3D mesh to the added mesh point at the center of the hole.

4. The method of claim 1, wherein the step of projecting the 3D mesh onto a 2D image comprises:
   projecting mesh points of the 3D mesh onto the 2D image while preserving connectivity between the mesh points.

5. The method of claim 1, wherein each edge of the projected mesh is shared by two triangle faces, the normal of an imaging place is $N_1$, the and normals of the two faces shared by and edge are $N_1$ and $N_2$, respectively, and the step of generating silhouette candidate edges in the projected mesh comprises:
   calculating $N_1 \cdot N_1$ and $N_1 \cdot N_2$ for each edge; and
   determining that an edge is a silhouette candidate edge when $N_1 \cdot N_1$ and $N_1 \cdot N_2$ have different signs for that edge.

6. The method of claim 1, wherein each edge of the projected mesh has two endpoints A and B which are shared by two triangle faces, and a third point in each of the two faces is $C_1$ and $C_2$, respectively, and the step of generating silhouette candidate edges in the projected mesh comprises:
   for each edge, determining that the edge is an edge candidate when $C_1$ and $C_2$ lie on the same side of the edge.

7. The method of claim 1, wherein the step of generating silhouette candidate edges in the projected mesh comprises:
   dividing a plurality of mesh points of the projected mesh into a set of inner points and a set of boundary points;
   pruning the set of inner points; and
   determining the silhouette candidate edges to be a set of edges connecting the boundary points.

8. The method of claim 7, wherein the step of dividing a plurality of mesh points of the projected mesh into a set of inner points and a set of boundary points comprises:
   for each mesh point, calculating a summation of internal angles of a closed contour defined by neighboring mesh points to the mesh point;
   determining each mesh point with a summation equal to zero to be a boundary point; and
   determining each mesh point with a summation equal to $2\pi$ or $-2\pi$ to be an internal point.

9. The method of claim 1, wherein the step of splitting each silhouette candidate edge that intersects with another edge in the projected mesh into two silhouette candidate edges comprises:
   detecting an intersection point between a silhouette candidate edge and another edge in the projected mesh; and
   adding a mesh point at the detected intersection point to divide the silhouette candidate edge into two silhouette candidate edges.

10. The method of claim 1, wherein the step of extracting the silhouette using an edge following process on the silhouette candidate edges comprises:
    starting in a downward direction from a left most mesh point of the set of silhouette candidate edges, following a series of right most neighbor silhouette candidate edges to return to the starting point.

11. The method of claim 1, further comprising:
    generating a silhouette mask in a 2D image from the extracted silhouette.

12. An apparatus for extracting a silhouette of a 3D mesh representing an anatomical structure, comprising:
    means for projecting the 3D mesh onto a 2D image;
    means for generating silhouette candidate edges in the projected mesh by pruning mesh points and edges of the projected mesh that lie completely inside a region enclosed by the projected mesh;
    means for splitting each silhouette candidate edge that intersects with another edge in the projected mesh into two silhouette candidate edges; and
    means for extracting the silhouette using an edge following process on the silhouette candidate edges.

13. The apparatus of claim 12, further comprising:
    means for converting the an 3D mesh from an open mesh to a closed mesh prior to projecting the 3D mesh to two dimensions.

14. The apparatus of claim 12, wherein the means for projecting the 3D mesh onto a 2D image comprises:
    means for projecting mesh points of the 3D mesh onto the 2D image while preserving connectivity between the mesh points.

15. The apparatus of claim 12, wherein each edge of the projected mesh is shared by two triangle faces, the normal of an imaging place is $N_1$, the and normals of the two faces shared by and edge are $N_1$ and $N_2$, respectively, and the means for generating silhouette candidate edges in the projected mesh comprises:

means for calculating $N_1 \cdot N_1$ and $N_1 \cdot N_2$ for each edge; and means for determining that an edge is a silhouette candidate edge when $N_1 \cdot N_1$ and $N_1 \cdot N_2$ have different signs for that edge.

16. The apparatus of claim 12, wherein each edge of the projected mesh has two endpoints A and B which are shared by two triangle faces, and a third point in each of the two faces is $C_1$ and $C_2$, respectively, and the means for generating silhouette candidate edges in the projected mesh comprises:

means for determining that an edge is an edge candidate when $C_1$ and $C_2$ lie on the same side of the edge.

17. The apparatus of claim 12, wherein the means for generating silhouette candidate edges in the projected mesh comprises:

means for dividing a plurality of mesh points of the projected mesh into a set of inner points and a set of boundary points;

means for pruning the set of inner points; and means for determining the silhouette candidate edges to be a set of edges connecting the boundary points.

18. The apparatus of claim 12, wherein the means for splitting each silhouette candidate edge that intersects with another edge in the projected mesh into two silhouette candidate edges comprises:

means for detecting an intersection point between a silhouette candidate edge and another edge in the projected mesh; and means for adding a mesh point at the detected intersection point to divide the silhouette candidate edge into two silhouette candidate edges.

19. The apparatus of claim 12, further comprising:

means for generating a silhouette mask in a 2D image from the extracted silhouette.

20. A non-transitory computer readable medium encoded with computer executable instructions for extracting a silhouette of a 3D mesh representing an anatomical structure, the computer executable instructions defining steps comprising:

projecting the 3D mesh onto a 2D image;

generating silhouette candidate edges in the projected mesh by pruning mesh points and edges of the projected mesh that lie completely inside a region enclosed by the projected mesh;

splitting each silhouette candidate edge that intersects with another edge in the projected mesh into two silhouette candidate edges; and extracting the silhouette using an edge following process on the silhouette candidate edges.

21. The non-transitory computer readable medium of claim 20, wherein the 3D mesh is an open mesh, further comprising computer executable instructions defining the step of:

converting the 3D mesh from an open mesh to a closed mesh prior to the step of projecting the 3D mesh to two dimensions.

22. The non-transitory computer readable medium of claim 20, wherein the computer executable instructions defining the step of projecting the 3D mesh onto a 2D image comprise computer executable instructions defining the step of:

projecting mesh points of the 3D mesh onto the 2D image while preserving connectivity between the mesh points.

23. The non-transitory computer readable medium of claim 20, wherein each edge of the projected mesh is shared by two triangle faces, the normal of an imaging place is $N_1$, the and normals of the two faces shared by and edge are $N_1$ and $N_2$, respectively, and the computer executable instructions defining the step of generating silhouette candidate edges in the projected mesh comprise computer executable instructions defining the steps of:

calculating $N_1 \cdot N_1$ and $N_1 \cdot N_2$ for each edge; and determining that an edge is a silhouette candidate edge when $N_1 \cdot N_1$ and $N_1 \cdot N_2$ have different signs for that edge.

24. The non-transitory computer readable medium of claim 20, wherein each edge of the projected mesh has two endpoints A and B which are shared by two triangle faces, and a third point in each of the two faces is $C_1$ and $C_2$, respectively, and the computer executable instructions defining the step of generating silhouette candidate edges in the projected mesh comprise computer executable instructions defining the step of:

for each edge, determining that the edge is an edge candidate when $C_1$ and $C_2$ lie on the same side of the edge.

25. The non-transitory computer readable medium of claim 20, wherein the computer executable instructions defining the step of generating silhouette candidate edges in the projected mesh comprise computer executable instructions defining the steps of:

dividing a plurality of mesh points of the projected mesh into a set of inner points and a set of boundary points;

pruning the set of inner points; and determining the silhouette candidate edges to be a set of edges connecting the boundary points.

26. The non-transitory computer readable medium claim 20, wherein the computer executable instructions defining the step of splitting each silhouette candidate edge that intersects with another edge in the projected mesh into two silhouette candidate edges comprise computer executable instructions defining the steps of:

detecting an intersection point between a silhouette candidate edge and another edge in the projected mesh; and adding a mesh point at the detected intersection point to divide the silhouette candidate edge into two silhouette candidate edges.

27. The non-transitory computer readable medium of claim 20, further comprising computer executable instructions defining the step of:

generating a silhouette mask in a 2D image from the extracted silhouette.

* * * * *